(No Model.)
G. H. ENNIS.
DUST PAN.
No. 419,115. Patented Jan. 7, 1890.
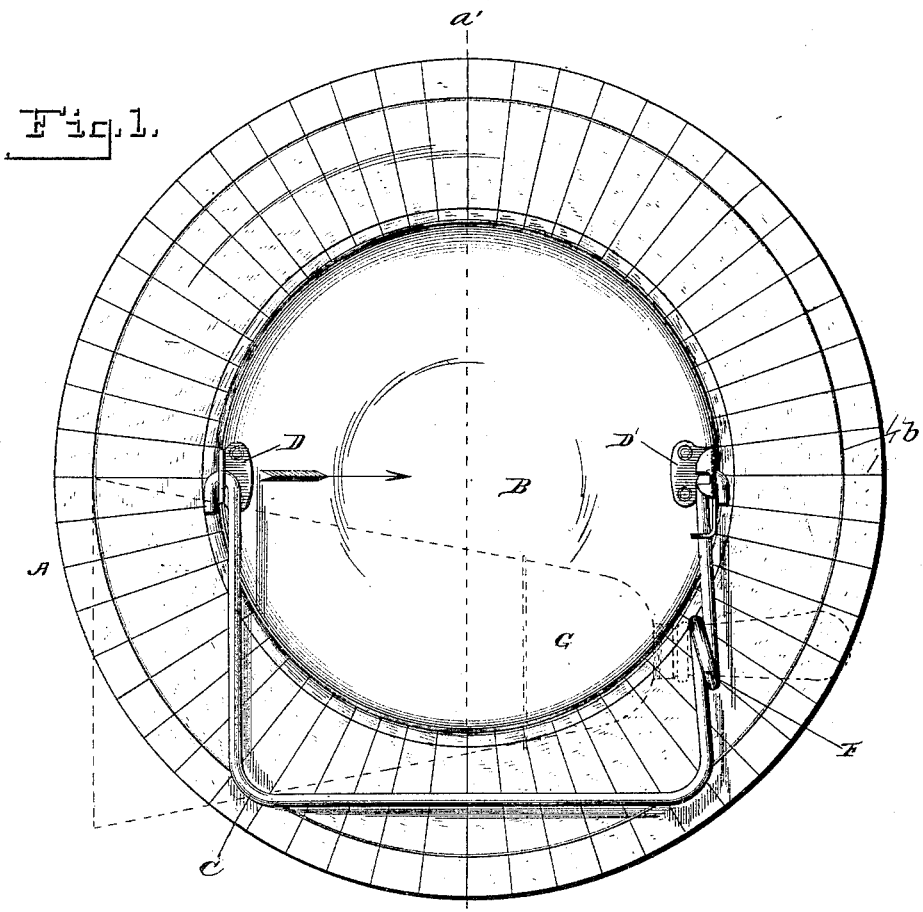
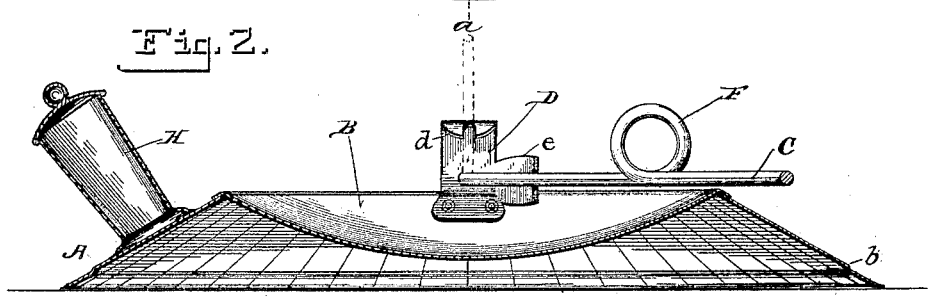
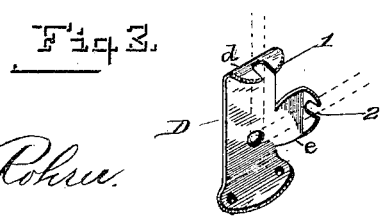
Witnesses
H. P. Rohr.
Harry C. Kennedy.
Inventor,
George H. Ennis,
by John C. Kennie,
Attorney
N. PETERS, Photo-Lithographer, Washington, D. C.

UNITED STATES PATENT OFFICE.

GEORGE H. ENNIS, OF TROY, NEW YORK, ASSIGNOR TO JESSIE D. ENNIS, OF SAME PLACE.

DUST-PAN.

SPECIFICATION forming part of Letters Patent No. 419,115, dated January 7, 1890.

Application filed December 20, 1888. Serial No. 294,150. (No model.)

*To all whom it may concern:*

Be it known that I, GEORGE H. ENNIS, a citizen of the United States, residing at Troy, in the county of Rensselaer and State of New York, have invented certain new and useful Improvements in Dust-Pans; and I do hereby declare the following to be a full, clear, and exact description of the invention, such as will enable others skilled in the art to which it appertains to make and use the same.

My invention relates to certain new and useful improvements in utensils for household use, which may be employed either as a dust-pan or for gathering crumbs and the like from tables, and for similar purposes.

My improved construction is illustrated in the accompanying drawings, wherein—

Figure 1 represents a plan view of the same. Fig. 2 represents a sectional view taken upon a plane indicated by the line $a\ a'$ of Fig. 1, and Fig. 3 represents in detailed perspective the bail-fastening device.

Similar letters and figures of reference indicate similar parts throughout the several views.

The utensil consists, primarily, of the portion A, preferably struck out from a single piece of sheet metal into the form of a truncated cone, as illustrated in the drawings. Near its base the piece A is preferably shaped or stamped in such manner as to produce an annular projection $b$, serving to impart stiffness to the lower edge and to prevent said edge from warping or bending. Upon the upper edge of the conical portion A is attached a receiving-basin B, preferably of such configuration that the material collected may be readily discharged therefrom. On opposite sides of the basin B are attached lugs D D' for the reception of the bail or handle C, said handle consisting, preferably, of a metal wire having a loop F therein, said loop being adapted to receive the handle of a brush G, as shown in dotted lines in Fig. 1. One of the lugs, as D', is provided with projections $d\ e$ at right angles to each other, and having notches 1 2, the purpose of these notches being to lock the bail C either in a vertical position or in a horizontal position, as required.

When used as a dust-pan, the bail is locked in a horizontal position, as indicated in the drawings, and the foot placed upon the edge of the pan, so as to steady it and press it down with the required pressure upon the floor. The dust or other material to be gathered from the floor is then swept up upon the inclined sides of the pan and into the receptacle or basin B. The lower edge of the pan is kept by the pressure of the foot in close contact with the floor, and the material to be gathered can be swept from a large area around the pan without moving the pan itself and without stooping over for that purpose. The even bearing-surface of the pan also lessens materially any liability of tipping it over while upon the floor and spilling the contents already gathered. When the dust or the like has been gathered from the floor, the bail C is locked into the vertical position, thereby permitting the pan to be carried off and its contents emptied without danger of tilting it during transport.

In gathering crumbs or the like from a table the utensil may be conveniently held by hand, the bail in this instance being locked in the horizontal position.

In Fig. 2 I have indicated at H a handle which may be applied to the utensil in place of the bail C, and this handle may be permanently or removably affixed to the inclined portion A, as desired.

The body portion of the pan may be in some instances stamped from a single piece of sheet steel, thereby producing an article of great strength and durability.

It is evident that instead of forming the inclined surface A of the pan as a truncated cone it may be formed as a truncated pyramid, which would be an equivalent construction, the conical surface being merely a pyramid having an infinite number of sides. I may also impart additional strength to the parts by corrugating the same, as will be readily understood.

Having thus described my invention, what I claim is—

1. A utensil of the kind described, having inclined sweeping-surfaces converging toward each other and a basin or receptacle at the summit of said surfaces, substantially as described.

2. A utensil of the kind described, consisting of an inclined portion A, having its lower edge of circular or polygonal contour and adapted to support the utensil, and a basin or receptacle B, connected with its upper edges, substantially as described.

3. As an improved article of manufacture, a dust-pan of circular form and having an inclined sweeping-surface around its whole circumference.

4. A utensil of the kind described, consisting of an inclined portion A, having its lower edge of circular or polygonal contour and adapted to support the utensil, a basin or receptacle B, connected with its upper edges, a bail, and attachment-lugs, said bail provided with vertical and horizontal projections having locking-notches for locking the bail in a vertical or in a horizontal position, substantially as described.

5. A utensil of the kind described, consisting of an inclined portion A, having its lower edge of circular or polygonal contour and adapted to support the utensil, a basin or receptacle B at the apex of the inclined portion, a bail, lugs for pivoting the bail to the utensil, vertical and horizontal projections having locking-notches for securing the bail in vertical or horizontal position, said bail being provided with a loop F, for holding a brush, substantially as described.

In testimony whereof I affix my signature in presence of two witnesses.

GEORGE H. ENNIS.

Witnesses:
T. FRANK REARDON,
DAVID WHITE.